United States Patent
Hosokawa et al.

(10) Patent No.: US 6,531,557 B1
(45) Date of Patent: Mar. 11, 2003

(54) MODIFIED POLYTETRAFLUOROETHYLENE FINE POWDER AND METHOD FOR THE PRODUCTION OF THE SAME

(75) Inventors: Kazutaka Hosokawa, Osaka (JP); Yoshinori Nanba, Osaka (JP); Takahisa Aoyama, Osaka (JP); Tetsuo Shimizu, Osaka (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/242,272

(22) PCT Filed: Aug. 7, 1997

(86) PCT No.: PCT/JP97/02742

§ 371 (c)(1),
(2), (4) Date: Mar. 12, 1999

(87) PCT Pub. No.: WO98/06762

PCT Pub. Date: Feb. 19, 1998

(30) Foreign Application Priority Data

Aug. 12, 1996 (JP) ................................. 8/212341

(51) Int. Cl.$^7$ ..................... C08F 214/26; C08F 216/12
(52) U.S. Cl. ..................... 526/247; 526/207; 526/250
(58) Field of Search ................. 526/247, 250, 526/207

(56) References Cited

U.S. PATENT DOCUMENTS 5,176,958 A  *  1/1993  Shimizu ................. 428/402
5,641,571 A  *  6/1997  Mayer ..................... 428/402

FOREIGN PATENT DOCUMENTS

| JP | 4927588 | 3/1974 |
| JP | 50103553 | 8/1975 |
| JP | 6116907 | 1/1986 |
| JP | 641711 | 1/1989 |
| JP | 7165828 | 6/1995 |

* cited by examiner

*Primary Examiner*—Fred Zitomer
(74) *Attorney, Agent, or Firm*—Birch, Stewart, Kolasch & Birch, LLP

(57) ABSTRACT

A modified polytetrafluoroethylene fine powder containing agglomerates of colloidal particles with an average particle size of from 0.05 to 0.5 μm which comprise a copolymer of tetrafluoroethylene and an olefin-monomer represented by $X(CF_2)_nOCF=CF_2$ in which X is a hydrogen atom, a fluorine atom or a chlorine atom, and n is an integer of 1 to 6, and/or $C_3F_7(OCF_2CF_2CF_2)_m[OCF(CF_3)CF_2]_pOCF=CF_2$ in which m and p are independently an integer of 0 to 4, provided that the sum of m and p is not 0 (zero), a content of the olefin monomer being from 0.02 to 0.3 wt. %, wherein the copolymer has a molecular weight distribution Mw/Mn of from 1.5 to 4.5 and a standard specific gravity of from 2.135 to 2.175. This modified polytetrafluoroethylene has good paste extrudability, and provides molded articles having good mechanical properties, in particular, pressure resistance.

7 Claims, 1 Drawing Sheet

Nitrogen gas
In measurement

MODIFIED POLYTETRAFLUOROETHYLENE FINE POWDER AND METHOD FOR THE PRODUCTION OF THE SAME This application is the national phase under 35 U.S.C. §371 of prior PCT International Application No. PCT/JP97/02742 which has an International filing date of Aug. 7, 1997 which designated the United States of America.

FIELD OF THE INVENTION

The present invention relates to a modified polytetrafluoroethylene fine powder having good mechanical properties, in particular, pressure resistance, and a method for the production of the same.

PRIOR ART

Polytetrafluoroethylene (PTFE) for molding roughly includes two types of powders, that is, a powder which is obtained by finely pulverizing granular resins prepared by suspension polymerization (granular resin), and a powder obtained by coagulating polymers from latexes prepared by aqueous dispersion (emulsion) polymerization and drying the coagulated polymers (fine powder), and both powders are practically used. These two types of the powders are processed by entirely different molding methods. For example, the former powder is processed by compression molding or ram extrusion molding, while the latter powder is processed by paste extrusion molding which is carried out by compounding liquid lubricants in the powder, or calender molding. Such PTFE is supposed to have a very high molecular weight, and cannot substantially be melt-processed. Thus, the above-described special molding methods are employed.

Powders of low molecular weight PTFE are called "waxes", and distinguished from the above PTFE for molding. Such low molecular weight PTFE powders are often used to modify the properties of other thermoplastic resins, thermosetting resins, coatings, inks, oils, etc. by blending, by making use of the excellent properties of PTFE, for example, lubricity. In connection with the properties of the low molecular weight PTFE, it is known that such PTFE has flowability in a melt state, and its molded articles are brittle and do not have sufficient mechanical strength for the practical applications.

As explained above, a PTFE fine powder is mainly shaped by a paste extrusion method in which a liquid lubricant is compounded in the PTFE fine powder and the compound is extruded with an extruder in the form of a rod or a tube. The extruded articles can be used as such, or rolled to form a sheet, and used as a sealing material in a non-sintered state. Alternatively, they are sintered and used as molded articles such as tubes, wire-coatings, etc.

Since PTFE fine powders are supplied to such special molding methods and applications, they are required to have high productivity in the paste extrusion molding process, and rolling and expansion processability. In addition, they are required to have sinterability and dimensional stability during sintering. Sintered molded articles are required to have good mechanical properties and transparency. It is known that all the required properties are largely governed by the properties of the PTFE fine powders used as raw materials.

However, such required properties cover a wide variety of properties from the shaping properties of the PTFE fine powders to the properties of the final molded articles. In general, conventional PTFE fine powders, which have been developed, may cost some properties to improve other properties. For example, some PTFE fine powders have good moldability, but the molded articles made of such PTFE fine powders have low mechanical properties. When the PTFE fine powders are evaluated from the viewpoint of moldability, some have good paste extrusion moldability, but low rolling properties or expandability.

Thus, many proposals have been made to improve the properties of PTFE fine powders.

For example, a method for improving PTFE while maintaining its inherent non-melt processability is known, which method comprises copolymerizing about 1 wt. % or less of other fluorine-containing monomer as a modifier with tetrafluoroethylene (TFE). The copolymer obtained by such a method is named modified PTFE and differentiated from melt-processable TFE copolymers (see JP-B-37-4643, JP-B-50-38159 (=U.S. Pat. No. 3,819,594) and JP-B-56-26242).

JP-B-37-4643 and JP-B-56-26242 disclose a method for improving paste extrudability at a high reduction ratio (HRR. RR (reduction ratio)=a ratio of the cross section of the cylinder of an extruder for paste extrusion into which a paste is charged to the cross section of the outlet of an extrusion die). However, the disclosed PTFE fine powder cannot be used in applications which require heat resistance at high temperature, since it provides molded articles having low heat stability.

JP-B-50-38159 discloses the production of fluoroalkyl vinyl ether-modified PTFE fine powder having a low standard specific gravity and a low melt viscosity, and describes that such modification can improve the mechanical properties, in particular, flexural life of the polymer.

JP-A-64-1711 discloses fluoroalkyl vinyl ether-modified PTFE fine powder having a low standard specific gravity and a high melt viscosity, and describes that the rollability and expandability of the polymer can be improved.

Furthermore, JP-A-7-165828 (=U.S. Pat. No. 5,641,571) discloses a PTFE micropowder comprising TFE and about 3 wt. % or less of a copolymerizable monomer, which has a polydispersibility of 1.5 to 2.5 in terms of Mw/Mn, a specific surface area (BET) of 7 to 13 $m^2/g$ and a primary particle size of 150 to 250 nm. This micropowder has flowability in a melt state and is used as a modifier. Thus, it is the same type of a material as the above-described waxes (low molecular weight PTFE).

Modified PTFE fine powders are mostly processed in the form of a wire coating or a tube, and used in fields where particularly high quality is required, for example, aircraft, automobiles, chemical industries, etc. In particular, tubes are used as flexible piping in hydraulic control systems, fuel supply pipes, high pressure steam pipes, chemical liquid transfer hoses, etc. In these applications, liquid leakage caused by the breakage of tubes should be avoided from the viewpoint of safety. Thus, it is desired to improve the mechanical properties, in particular, pressure resistance of the tubes.

SUMMARY OF THE INVENTION

One object of the present invention is to provide a modified PTFE fine powder, which has good paste exrudability and transparency, and can provide molded articles having good mechanical properties, in particular, excellent pressure resistance.

Another object of the present invention is to provide a method for the production of such a PTFE fine powder.

To achieve the above objects, the present invention provides a modified PTFE fine powder comprising agglomerates of colloidal particles with an average particle size of from 0.05 to 0.5 μm which comprise a copolymer of tetrafluoroethylene and at least one olefin monomer selected from the group consisting of a fluoroalkyl vinyl ether of the general formula:

$$X(CF_2)_n OCF=CF_2 \quad (I)$$

wherein X is a hydrogen atom, a fluorine atom or a chlorine atom, and n is an integer of 1 to 6, and a fluoroalkyl vinyl ether of the general formula:

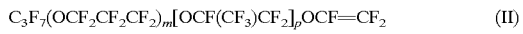

$$C_3F_7(OCF_2CF_2CF_2)_m[OCF(CF_3)CF_2]_p OCF=CF_2 \quad (II)$$

wherein m and p are independently an integer of 0 to 4, provided that the sum of m and p is not 0 (zero), preferably $C_3F_7 OCF=CF_2$, the content of the olefin monomer being from 0.02 to 0.3 wt. %, preferably from 0.03 to 0.2 wt. %, wherein the copolymer has a molecular weight distribution Mw/Mn of from 1.5 to 4.5, preferably from 2.0 to 4.0 and a standard specific gravity of from 2.135 to 2.175, preferably from 2.140 to 2.160.

DETAILED DESCRIPTION OF THE INVENTION

Figure 1:
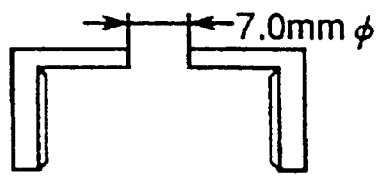
FIG. 1 is a cross section of a tool which is used in the measurement of the burst pressure of a sample in Examples.
Figure 1B:
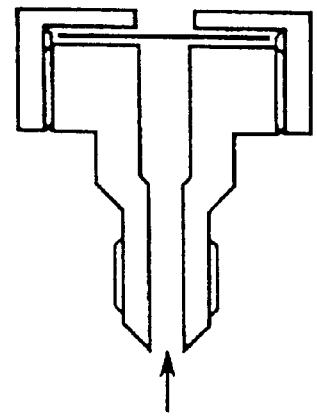
FIG. 1B is a cross section during the measurement.
Figure 1A:
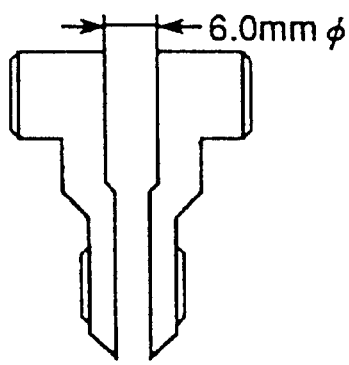
FIG. 1A is a cross section prior to the fitting of a sample to the tool.

The modified PTFE fine powder of the present invention may be prepared by a polymerization method in which a gaseous chain transfer agent is present in a polymerization system when tetrafluoroethylene is copolymerized with at least one olefin monomer selected from the group consisting fluoroalkyl vinyl ethers of the above general formulas (I) and (II), in an aqueous medium containing 0.02 to 0.3 wt. % of a water-soluble fluorine-containing dispersant.

In the modified PTFE fine powder of the present invention, it is important to use the above fluoroalkyl vinyl ether (I) and/or (II) as a modifier. The use of other known modifiers, for example, hexafluoropropene or chlorotrifluoroethylene cannot achieve the effects of the present invention.

The content of the fluoroalkyl vinyl ether (I) and/or (II) in the copolymer is from 0.02 to 0.3 wt. %, preferably from 0.03 to 0.2 wt. % based on the weight of the copolymer. When the content of the fluoroalkyl vinyl ether is less than 0.02 wt. %, the copolymer has low paste extrudability at HRR, sinterability and transparency. When the content exceeds 0.3 wt. %, a reaction rate decreases, and thus the productivity of the copolymer deteriorates.

The characteristics of the modified PTFE fine powder of the present invention are the narrower molecular weight distribution Mw/Mn than those of the conventional modified PTFE fine powders, and a small standard specific gravity (SSG). These characteristics contribute to the good mechanical properties of molded articles.

In general, the molecular weight distribution of a polymer is expressed by the ratio of a weight average molecular weight Mw to a number average molecular weight Mn. The measurement of the molecular weight distribution is explained by S. Wu in Polymer Engineering & Science, 1988, Vol. 28, 538 and 1989, Vol. 29, 273.

A molecular weight distribution Mw/Mn is usually from 1.5 to 4.5 in the present invention. When the molecular weight distribution exceeds 4.5, molded articles have low pressure resistance. When the molecular weight distribution is less than 1.5, a large amount of a chain transfer agent should be present in a polymerization system, land thus a reaction rate decreases and the productivity of a polymer deteriorates. A preferred molecular weight distribution is in the range between 2.0 and 4.0, in particular, between 2.6 and 4.0.

It is known that a standard specific gravity has a correlation with a molecular weight of PTFE, and a smaller standard specific gravity means a larger molecular weight. Thus, a standard specific gravity is used as the yardstick of a molecular weight.

In general, a high molecular weight is preferable for mechanical properties. The standard specific gravity of modified PTFE having sufficient mechanical properties for practical applications is 2.175 or less. The amount of a polymerization initiator should be very small to produce modified PTFE having a standard specific gravity of less than 2.135 (namely a very high molecular weight). Such a very small amount of an initiator is unpreferable from the economical point of view, since a polymerization rate greatly decreases. The standard specific gravity of the modified PTFE fine powder is usually from 2.135 to 2.175, preferably from 2.140 to 2.160.

The modified PTFE fine powder of the present invention comprises agglomerates of colloidal particles having a number average particle size of from 0.05 to 0.5 μm. When a number average particle size is less than 0.05 μm, a pressure in the paste extrusion process largely increases, and thus the molding at HRR becomes difficult. When a number average particle size exceeds 0.5 μm, a latex has low sedimentation stability, which is less preferable for the production of a fine powder.

The modified PTFE fine powder of the present invention may be produced by the following method.

Chain transfer agents used in the polymerization of TFE may be hydrogen; hydrocarbons such as methane, ethane, propane, butane, etc.; halohydrocarbons such as $CH_3Cl$, $CH_2Cl_2$, $CH_2CF_2$, etc.; and water-soluble ones such as methanol, ethanol, etc. Chain transfer agents which are in a gas state under conventional polymerization conditions are preferred to control the molecular weight and molecular weight distribution of modified PTFE.

Examples of the gaseous chain transfer agents are hydrogen; hydrocarbons such as methane, ethane, propane, butane, etc.; and halohydrocarbons such as $CH_3Cl$, $CH_2CF_2$, etc. Among them, methane, ethane and propane are preferable, and methane and ethane are particularly preferable. Methane and ethane can function as chain transfer agents in a small amount, and they do not decrease a polymerization rate greatly.

The amount of a chain transfer agent is usually from 1 to 1000 ppm, preferably from 1 to 500 ppm based on the whole TFE monomer in a polymerization system.

A polymerization initiator may be any one that is used in the conventional polymerization methods of TFE. Examples of the polymerization initiator include persulfates such as ammonium persulfate, potassium persulfate, etc. and water-soluble organic peroxides such as disuccinic acid peroxide, diglutaric acid peroxide, etc. Persulfates are preferable.

The amount of a persulfate is usually from 2 to 300 ppm, preferably from 2 to 200 ppm based on an aqueous medium.

The amount of a polymerization initiator may be determined in accordance of an intended standard specific gravity. For example, the amount of a polymerization initiator is from 2 to 20 ppm at a polymerization temperature in the range between 70 and 80° C.

A polymerization temperature may be selected from a wide range between 10 and 95° C. When persulfates are used, a polymerization temperature is from 40 to 80° C. When a polymerization is carried out at a relatively low temperature, reducing agents such as sulfites, acidic sulfites, etc. are used in combination with persulfates to form a redox system.

Examples of a water-soluble fluorine-containing dispersant include a compound of the general formula:

$$X(CF_2)_a COOH$$

wherein X is a hydrogen atom, a fluorine atom or a chlorine atom, and a is an integer of 6 to 12, a compound of the general formula:

$$Cl(CF_2CFCl)_b CF_2 COOH$$

wherein b is an integer of 2 to 6, a compound of the general formula:

$$(CF_3)_2 CF(CF_2CF_2)_c COOH$$

wherein c is an integer of 2 to 6, a compound of the general formula:

$$F(CF_2)_d O(CFYCF_2O)_e CFYCOOH$$

wherein Y is a fluorine atom or a trifluoromethyl group, d is an integer of 1 to 5, and e is an integer of 1 to 5, and their ammonium salts or alkali metal salts (e.g. potassium salts, sodium salts).

In particular, it is preferable to use a compound of the formula:

$$C_n F_{2n+1} COOX$$

or $$C_3 F_7 O[CF(CF_3)CF_2O]_q CF(CF_3)COOX$$

wherein n is an integer of 6 to 9, q is 1 or 2, and x is an ammonium group or an alkali metal atom.

A water-soluble fluorine-containing dispersant may be charged into a polymerization reaction system prior to the start of a reaction all at once, although it is possible to carry out a programmed charging as described in JP-B-44-14466.

The amount of a water-soluble fluorine-containing dispersant is from 0.02 to 0.3 wt. %, preferably from 0.03 to 0.2 wt. % based on the weight of an aqueous medium used in the polymerization reaction.

A fluoroalkyl vinyl ether (I) and/or (II) as a modifier according to the present invention can be charged in a polymerization system all at once at the start of the reaction, or added portion by portion or continuously in the course of the reaction.

In some cases, a hydrocarbon having 12 or more carbon atoms, which is substantially inactive against the reaction and in a liquid state under the polymerization conditions, may be used as a dispersion stabilizer for a polymerization system, in an amount of 2 to 10 wt. parts per 100 wt. parts of an aqueous medium.

Furthermore, a buffer such as ammonium carbonate, ammonium phosphate, etc. may be added to adjust a pH value in the course of a reaction.

The polymerization reaction proceeds while maintaining a reaction pressure in a range between 0.6 and 3.9 MPa, preferably between 0.9 and 3.0 MPa by the pressurization with TFE itself.

The polymerization reaction is terminated by stopping stirring and discharging monomers outside the reaction system, when a polymer concentration reaches 20 to 45 wt. %. Then, the aqueous dispersion of a polymer (which is called a polymer latex or simply a latex) is recovered from a reactor, and transferred to subsequent steps, namely, a coagulation step and a drying step.

A polymer can be coagulated by diluting a polymer latex with water to a polymer concentration of 10 to 20 wt. %, optionally adjusting pH to a neutral or alkaline value, and then agitating the diluted latex in a vessel equipped with an agitator more vigorously than in the polymerization reaction. The agitation may be carried out with the addition of coagulants such as water-soluble organic compounds (e.g. methanol, acetone, etc.), inorganic salts (e.g. potassium nitrate, ammonium carbonate, etc.), inorganic acids (e.g. hydrochloric acid, sulfuric acid, nitric acid, etc.), and the like. Alternatively, the coagulation can continuously be carried out with an in-line mixer, and the like.

Filler-containing PTFE fine powders, in which the filler is uniformly mixed, can be obtained by the addition of pigments for coloration or various fillers for the improvement of mechanical properties prior to or during the coagulation.

Coagulated powders may be dried by any method such as the application of vacuum, high frequency, hot air, etc. while maintaining a wet powder obtained by coagulation in a state in which the powder does not unnecessarily flow, or preferably in a static state. The friction of particles, in particular, at a high temperature will have undesirable influences on the fine powder type PTFE, because such PTFE particles are easily fibrillated even with a small shear force and thus they lose the original stable particulate structure.

The PTFE fine powder of the present invention is suitable as a molding material. Preferable examples of the application of such a PTFE fine powder include hydraulic system tubes or fuel tubes of aircraft and automobiles, and flexible hoses for transporting chemical liquids, steam, etc. in the chemical industries.

Apart from the use as fine powders, the polymer of the present invention may be used in applications which utilize the latex of such a polymer. For example, nonionic surfactants are added to a latex after the reaction to stabilize the latex, and then the latex is concentrated. Optionally, organic or inorganic fillers are added to formulate a coating. The coating is applied onto the surface of a metal or a ceramic to obtain a coating surface which has non-tackiness and a low friction coefficient, and also good gloss, smoothness, wear resistance, weather resistance and heat resistance. Such a coating is suitable for coating rolls or cookware, impregnation of glass cloth, and the like.

Herein, polymer latexes and PTFE fine powders are anaylyzed and tested as follows:

1) Polymer Concentration

Ten grams of a polymer latex were sampled on a laboratory dish, and dried at 150° C. for about 3 hours to evaporate the medium to dryness. The residual solid was weighed, and then a polymer concentration is calculated from the latex weight and the solid weight.

2) Number Average Particle Size

A calibration curve is prepared using a known sample. That is, the transmittance of an incident light of 550 nm per a unit path length of a polymer latex, which has been diluted with water to a solid content of 0.15 wt. %, is measured, and also a number-based length average particle size is determined by measuring diameters of particles in a certain direction with a transmission electron microscope. Then, a calibration curve is drawn using the light transmission and the average particle size.

The average particle size of a certain sample is read from the calibration curve using a transmittance which is measured with the certain sample under the same conditions as above.

3) Content of a Modifier

As the content of a fluoroalkyl vinyl ether in a polymer, a value (wt. %) is used, which is obtained by multiply a ratio of an absorption intensity at 995 cm$^{-1}$ to that at 935 cm$^{-1}$ in an IR absorption band, by 0.14.

4) Standard Specific Gravity (SSG)

SSG is measured by a water-replacement method using a sample which is prepared according to ASTM D4895-89.

5) Molecular Weight Distribution Mw/Mn

A viscoelastic meter RDS-2 (manufactured by Rheometrix) is used as a measuring apparatus, and a dynamic viscoelasticity is measured at 380° C. A frequency range is between 0.001 and 500 rad/sec., and the sampling frequencies of measured values are 5 points in one figure at a logarithmically equal interval. The measured values are data-processed by the method of S. Wu (Polymer Engineering & Science, 1988, Vol. 28, 538 and 1989, Vol. 29, 273) to obtain Mw, Mn and Mw/Mn. In this case, a time t is equal to $1/\omega$, and G(t) is equal to G' ($\omega$) in which $\omega$ is a frequency, G(t) is a relaxation modulus, and G'($\omega$) is a storage modulus.

The measurements are repeated until the average deviation of G' ($\omega$) at each measuring frequency becomes less than 5% in two successive measurements.

6) Pressure Resistance Test (Measurement of Breakage Pressure)

A PTFE fine powder (90 g) is filled in a cylindrical mold having a diameter of 50 mm in an atmosphere which is maintained in a temperature rage between 23 and $_{25}$° C., and the upper part of the powder is leveled. Then, a pressure is gradually increased, and the powder was compressed under 29.4 MPa for 2 minutes. Thereafter the compressed powder was removed from the mold to obtain a premolded article. The premolded article is sintered at 370° C. for 90 minutes in an air-circulating furnace, and then cooled to 250° C. at a cooling rate of 60° C./hr. After maintaining the article at 250° C. for 30 minutes, it is removed from the furnace, and allowed to cool to room temperature.

This article is cut to form a film having a thickness of 0.50 mm, and annealed at 380° C. for 5 minutes in an air-circulating furnace. Then, the film is cooled to 250° C. at a cooling rate of 10° C./min. and maintained at 250° C. for 5 minutes, following by allowing to cool to room temperature.

The annealed film sample is attached to a tool shown in FIG. 1, and nitrogen gas is blown in an atmosphere of 0° C. to pressurize the sample. The pressure is quickly raised to 3.43 MPa, and maintained at 3.43 MPa for 60 seconds. Thereafter, the pressure is increased by 0.098 MPa, and each pressure is maintained for 60 seconds. Thus, a pressure at which the film is broken is recorded. The measurement is repeated three times, and three pressures at break are averaged and used as a breakage pressure.

7) Paste Extrusion Test (RR: 1500)

A PTFE fine powder (50 g) and a hydrocarbon oil (ISOPAR E manufactured by Exxon Chemical Co., Ltd.) (9.2 g) as an extrusion aid are mixed in a glass bottle and aged at room temperature (25±2° C.) for one hour. Then, the mixture is charged in an extrusion die having a reduction angle of 30 degrees and an orifice of 0.57 mm in inner diameter and 1.95 mm in land-length at its lower end, which die is equipped with a cylinder having an inner diameter of 25.4 mm. Then, a load of 5.7 MPa is applied to a piston inserted in the cylinder, and maintained for one minute. Immediately after that, the above mixture is extruded through the orifice at room temperature at a ram speed of 20 mm/min. to obtain a rod. A pressure in an interval in which the pressure is equilibrated in the latter extrusion period is divided by the cross sectional area of the cylinder is used as an extrusion pressure (MPa).

EXAMPLES

Example 1

In a 6 liter stainless-steel (SUS 316) autoclave equipped with stainless-steel (SUS 316) anchor type agitation blades and a temperature-regulating jacket, deionized water (2980 ml), liquid paraffin (a first class grade reagent, manufactured by KISHIDA Chemical Co., Ltd.) (120 g) and ammonium perfluorooctanoate (3.0 g)were charged, and the internal atmosphere was replaced with nitrogen gas three times and with TFE gas two times while maintaining the autoclave at 70° C. to purge oxygen. Then, ethane gas (1 cc) was charged, and the internal pressure was raised to 1.52 MPa with the TFE gas. The mixture was stirred at 280 rpm, and the internal temperature was maintained at 70° C.

After that, perfluoropropyl vinyl ether (PPVE) (2.8 g) and then the solution of ammonium persulfate (12 mg) dissolved in water (20 ml) were charged under the pressure of TFE to raise the internal pressure of the autoclave to 1.57 MPa. Thus, the reaction acceleratively proceeded, but the reaction temperature was maintained at 70° C., and the stirring rate was kept at 280 rpm. TFE was continuously supplied to maintain the internal pressure of the autoclave at 1.57±0.05 MPa.

The reaction was terminated by stopping the stirring and supply of the monomer, and immediately discharging the gas in the autoclave down to an atmospheric pressure, when 1219 g of the TFE monomer was consumed.

The total reaction time was 17.2 hours, and the average particle size was 0.18 $\mu$m. The polymer content of the obtained latex was 28.9 wt. %.

The obtained latex was coagulated, and the coagulated polymer was washed. Then, the polymer powder was dried at 140° C. for 18 hours. With the obtained fine powder, a PPVE content in the polymer was measured, and it was 0.140 wt. %. The polymer had a SSG of 2.165, and a molecular weight distribution Mw/Mn of 2.72.

The breakage pressure of the molded film was 5.48 MPa, and the pressure resistance was good. The paste extrusion pressure at a RR of 1500 was 141 MPa, and the continuous molded article was produced.

Example 2

In the same autoclave as that used in Example 1, deionized water (2980 ml), liquid paraffin (a first class grade reagent, manufactured by KISHIDA Chemical Co., Ltd.) (120 g) and ammonium perfluorooctanoate (3.0 g) were charged, and the internal atmosphere was replaced with nitrogen gas three times and with TFE gas two times while maintaining the autoclave at 55° C. to purge oxygen. Then, ethane gas (2 cc) was charged, and the internal pressure was raised to 1.03 MPa with the TFE gas. The mixture was stirred at 280 rpm, and the internal temperature was maintained at 55° C.

After that, PPVE (2.5 g) and then the solution of ammonium persulfate (21 mg) dissolved in water (20 ml) were charged under the pressure of TFE to raise the internal pressure of the autoclave to 1.08 MPa. Thus, the reaction acceleratively proceeded, but the reaction temperature was maintained at 55° C., and the stirring rate was kept at 280 rpm. TFE was continuously supplied to maintain the internal pressure of the autoclave at 1.08±0.05 MPa.

The reaction was terminated by stopping the stirring and supply of the monomer, and immediately discharging the gas in the autoclave down to an atmospheric pressure, when 1348 g of the TFE monomer was consumed.

The total reaction time was 27.3 hours, and the average particle size was 0.20 µm. The polymer content of the obtained latex was 31.0 wt. %.

The obtained latex was post-processed in the same manners as in Example 1 to obtain a fine powder. A PPVE content in the polymer was 0.115 wt. %. The polymer had a SSG of 2.153, and a molecular weight distribution Mw/Mn of 3.89.

The breakage pressure of the molded film was 5.80 MPa, and the pressure resistance was good. The paste extrusion pressure at a RR of 1500 was 111 MPa, and the continuous molded article was produced.

Example 3

In the same autoclave as that used in Example 1, deionized water (2980 ml), liquid paraffin (a first class grade reagent, manufactured by KISHIDA Chemical Co., Ltd.) (120 g) and ammonium perfluorooctanoate (3.0 g) were charged, and the internal atmosphere was replaced with nitrogen gas three times and with TFE gas two times while maintaining the autoclave at 50° C. to purge oxygen. Then, ethane gas (10 cc) was charged, and the internal pressure was raised to 1.03 MPa with the TFE gas. The mixture was stirred at 280 rpm, and the internal temperature was maintained at 50° C.

After that, PPVE (3.0 g) and then the solution of ammonium persulfate (45 mg) dissolved in water (20 ml) were charged under the pressure of TFE to raise the internal pressure of the autoclave to 1.08 MPa. Thus, the reaction acceleratively proceeded, but the reaction temperature was maintained at 50° C., and the stirring rate was kept at 280 rpm. TFE was continuously supplied to maintain the internal pressure of the autoclave at 1.08±0.05 MPa.

The reaction was terminated by stopping the stirring and supply of the monomer, and immediately discharging the gas in the autoclave down to an atmospheric pressure, when 1404 g of the TFE monomer was consumed.

The total reaction time was 30.4 hours, and the average particle size was 0.19 µm. The polymer content of the obtained latex was 31.9 wt. %.

The obtained latex was post-processed in the same manners as in Example 1 to obtain a fine powder. A PPVE content in the polymer was 0.149 wt. %. The polymer had a SSG of 2.161, and a molecular weight distribution Mw/Mn of 2.10.

The breakage pressure of the molded film was 5.52 MPa, and the pressure resistance was good. The paste extrusion pressure at a RR of 1500 was 125 MPa, and the continuous molded article was produced.

Example 4

In the same autoclave as that used in Example 1, deionized water (2980 ml), liquid paraffin (a first class grade reagent, manufactured by KISHIDA Chemical Co., Ltd.) (120 g) and ammonium perfluorooctanoate (3.0 g) were charged, and the internal atmosphere was replaced with nitrogen gas three times and with TFE gas two times while maintaining the autoclave at 70° C. to purge oxygen. Then, ethane gas (2 cc) was charged, and the internal pressure was raised to 2.69 MPa with the TFE gas. The mixture was stirred at 280 rpm, and the internal temperature was maintained at 70° C.

After that, PPVE (5.0 g) and then the solution of ammonium persulfate (30 mg) dissolved in water (20 ml) were charged under the pressure of TFE to raise the internal pressure of the autoclave to 2.74 MPa. Thus, the reaction acceleratively proceeded, but the reaction temperature was maintained at 70° C., and the stirring rate was kept at 280 rpm. TFE was continuously supplied to maintain the internal pressure of the autoclave at 2.74±0.05 MPa.

The reaction was terminated by stopping the stirring and supply of the monomer, and immediately discharging the gas in the autoclave down to an atmospheric pressure, when 1425 g of the TFE monomer was consumed.

The total reaction tide was 2.2 hours, and the average particle size was 0.18 µm. The polymer content of the obtained latex was 32.2 wt. %.

The obtained latex was post-processed in the same manners as in Example 1 to obtain a fine powder. A PPVE content in the polymer was 0.132 wt. %. The polymer had a SSG of 2.152, and a molecular weight distribution Mw/Mn of 3.04.

The breakage pressure of the molded film was 5.38 MPa, and the pressure resistance was good. The paste extrusion pressure at a RR of 1500 was 154 MPa, and the continuous molded article was produced.

Comparative Example 1

The following experiment was carried out according to the method described in JP-B-50-38159.

In the same autoclave as that used in Example 1, deionized water (2980 ml), liquid paraffin (a first class grade reagent, manufactured by KISHIDA Chemical Co., Ltd.) (120 g) and ammonium perfluorooctanoate (3.0 g) were charged, and the internal atmosphere was replaced with nitrogen gas three times and with TFE gas two times while maintaining the autoclave at 70° C. to purge oxygen. Then, the internal pressure was raised to 2.69 MPa with the TFE gas. The mixture was stirred at 280 rpm, and the internal temperature was maintained at 70° C.

After that, PPVE (5.0 g), and then the solution of ammonium persulfate (30 mg) dissolved in water (20 ml) were charged under the pressure of TFE to raise the internal pressure of the autoclave to 2.74 MPa. The reaction temperature was maintained at 70° C., and the stirring rate was kept at 280 rpm. TFE was continuously supplied to maintain the internal pressure of the autoclave at 2.74±0.05 MPa.

The reaction was terminated by stopping the stirring and supply of the monomer, and immediately discharging the gas in the autoclave down to an atmospheric pressure, when 1292 g of the TFE monomer was consumed.

The total reaction time was 1.9 hours, and the average particle size was 0.18 µm. The polymer content of the obtained latex was 30.1 wt. %.

The obtained latex was post-processed in the same manners as in Example 1 to obtain a fine powder. A PPVE content in the polymer was 0.127 wt. %. The polymer had a SSG of 2.149, and a large molecular weight distribution Mw/Mn of 5.00. Thus, the pressure resistance was low.

Comparative Example 2

The following experiment was carried out according to the method described in JP-A-64-1711.

In the same autoclave as that used in Example 1, deionized water (2960 ml), liquid paraffin (a first class grade reagent, manufactured by KISHIDA Chemical Co., Ltd.) (120 g) and ammonium perfluorooctanoate (3.0 g) were charged, and the internal atmosphere was replaced with nitrogen gas three times and with TFE gas two times while maintaining the autoclave at 70° C. to purge oxygen. Then, the internal pressure was raised to 2.69 MPa with the TFE gas. The mixture was stirred at 280 rpm, and the internal temperature was maintained at 70° C.

After that, PPVE (5.0 g) and then the solution of ammonium persulfate (51 mg) dissolved in water (20 ml) were charged under the pressure of TFE to raise the internal pressure of the autoclave to 2.74 MPa. The reaction temperature was maintained at 70° C., and the stirring rate was kept at 280 rpm. TFE was continuously supplied to maintain the internal pressure of the autoclave at 2.74±0.05 MPa.

When the amount of TFE consumed in the reaction reached 640 g, the solution of hydroquinone (25.6 mg) dissolved in water (20 ml) was charged under the pressure of TFE. The reaction was terminated by stopping the stirring and supply of the monomer, and immediately discharging the gas in the autoclave down to an atmospheric pressure, when 1280 g of the TFE monomer was consumed.

The total reaction time was 4.1 hours, and the average particle size was 0.19 μm. The polymer content of the obtained latex was 29.9 wt. %.

The obtained latex was post-processed in the same manners as in Example 1 to obtain a fine powder. A PPVE content in the polymer was 0.118 wt. %. The polymer had a SSG of 2.155, and a large molecular weight distribution Mw/Mn of 6.80. Thus, the pressure resistance was low.

TABLE 1

| (unit) | Example No. 1 | 2 | 3 | 4 | C. Example No. 1 | 2 |
|---|---|---|---|---|---|---|
| Reaction pressure (MPa) | 1.57 | 1.08 | 1.08 | 2.74 | 2.74 | 2.74 |
| Reaction temp. (° C.) | 70 | 55 | 50 | 70 | 70 | 70 |
| Charged amount of ethane (cc) | 1 | 2 | 10 | 1 | 0 | 0 |
| Charged amount of PPVE (g) | 2.8 | 2.5 | 3.0 | 5.0 | 5.0 | 5.0 |
| Charged amount of APS (mg) | 12 | 21 | 45 | 30 | 30 | 51 |
| Reaction time (hrs) | 17.2 | 27.3 | 30.4 | 2.2 | 1.9 | 4.1 |
| Polymer concentration (wt. %) | 28.9 | 31.0 | 31.9 | 32.2 | 30.1 | 29.9 |
| Number average particle size (μm) | 0.18 | 0.20 | 0.19 | 0.18 | 0.18 | 0.19 |
| PPVE content (wt. %) | 0.140 | 0.115 | 0.149 | 0.132 | 0.127 | 0.118 |
| SSG | 2.165 | 2.153 | 2.161 | 2.152 | 2.149 | 2.155 |
| Mw/Mn | 2.72 | 3.89 | 2.10 | 3.04 | 5.00 | 6.80 |
| Breakage pressure (MPa) | 5.48 | 5.80 | 5.52 | 5.38 | 4.99 | 4.60 |
| Extrusion pressure (MPa) | 141 | 111 | 125 | 154 | 148 | 136 |

What is claimed is:

1. A modified polytetrafluoroethylene fine powder comprising agglomerates of colloidal particles with an average particle size of from 0.05 to 0.5 μm which comprise a copolymer of tetrafluoroethylene and at least one olefin monomer selected from the group consisting of a fluoroalkyl vinyl ether of the general formula:

$$X(CF_2)_nOCF=CF_2$$

wherein X is a hydrogen atom, a fluorine atom or a chlorine atom, and n is an integer of 1 to 6, and a fluoroalkyl vinyl ether of the general formula:

$$C_3F_7(OCF_2CF_2CF_2)_m[OCF(CF_3)CF_2]_pOCF=CF_2$$

wherein m and p are independently an integer of 0 to 4, provided that the sum of m and p is not 0 (zero), a content of said olefin monomer being from 0.02 to 0.3 wt. %, wherein said copolymer has a molecular weight distribution Mw/Mn of from 1.5 to 4.5 and a standard specific gravity of from 2.135 to 2.175.

2. A modified polytetrafluoroethylene fine powder according to claim 1, wherein said molecular weight distribution Mw/Mn is from 2.0 to 4.0.

3. A modified polytetrafluoroethylene fine powder according to claim 1, wherein said standard specific gravity is from 2.140 to 2.160.

4. A modified polytetrafluoroethylene fine powder according to claim 1, wherein said fluoroalkyl vinyl ether is a compound of the general formula:

$$X(CF_2)_nOCF=CF_2$$

wherein X is a hydrogen atom, a fluorine atom or a chlorine atom, and n is an integer of 1 to 6.

5. A method for preparing a modified polytetrafluoroethylene fine powder as claimed in claim 1 comprising copolymerizing tetrafluoroethylene and at least one olefin monomer selected from the group consisting of a fluoroalkyl vinyl ether of the general formula:

$$X(CF_2)_nOCF=CF_2$$

wherein X is a hydrogen atom, a fluorine atom or a chlorine atom, and n is an integer of 1 to 6, and a fluoroalkyl vinyl ether of the general formula:

$$C_3F_7(OCF_2CF_2CF_2)_m[OCF(CF_3)CF_2]_pOCF=CF_2$$

wherein m and p are independently an integer of 0 to 4, provided that the sum of m and p is not 0 (zero), in an aqueous medium containing 0.02 to 0.3 wt. % of a water-soluble fluorine-containing dispersant, wherein a gaseous chain transfer agent is present in the polymerization system.

6. A method according to claim 5, wherein said chain transfer agent is hydrogen, methane, ethane or propane.

7. A method according to claim 5, wherein a polymerization initiator is ammonium persulfate or an alkali metal persulfate, and a reaction temperature is from 40 to 80° C.

* * * * *